United States Patent [19]

Chesler

[11] Patent Number: 4,957,364

[45] Date of Patent: Sep. 18, 1990

[54] HELICAL BEND PROOF TESTING OF OPTICAL FIBERS

[75] Inventor: Ronald B. Chesler, Woodland Hills, Calif.

[73] Assignee: Hughes Aircraft Company, Los Angeles, Calif.

[21] Appl. No.: 339,845

[22] Filed: Apr. 18, 1989

[51] Int. Cl.$^5$ ............................................. G01N 21/88
[52] U.S. Cl. ..................................................... 356/73.1
[58] Field of Search ......................................... 356/73.1

[56] References Cited

FOREIGN PATENT DOCUMENTS

| 58-223734 | 12/1983 | Japan | 356/73.1 |
| 61-260139 | 11/1986 | Japan | 356/73.1 |
| 1357713 | 12/1987 | U.S.S.R. | 356/73.1 |

Primary Examiner—Vincent P. McGraw
Attorney, Agent, or Firm—R. M. Heald; R. A. Hays; W. Denson-Low

[57] ABSTRACT

An optical fiber is proof tested by bending it relative to the fiber axis by a preselected amount, in all directions and at all locations along the length of the fiber. In one approach, the optical fiber is wrapped around a cylindrical mandrel in a helical pattern and drawn over the mandrel through its entire length. With the preferred helical angle of about 45 degrees, two wraps of the optical fiber around the mandrel ensure that all of the fiber will be bent in all directions. If a flaw exists in the optical fiber that would cause failure at any amount of bending below that of the preselected amount, this proof test will cause the fiber to fail so that the weak point may be eliminated.

18 Claims, 3 Drawing Sheets

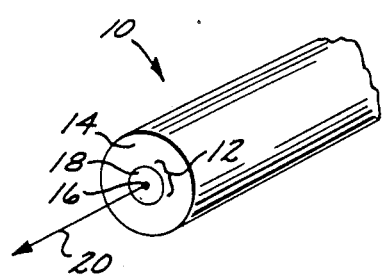
FIG. 1
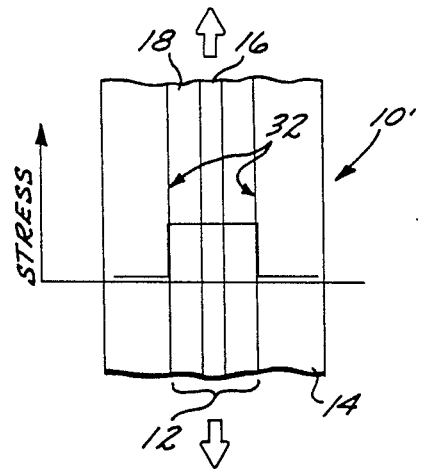
FIG. 3
FIG. 2
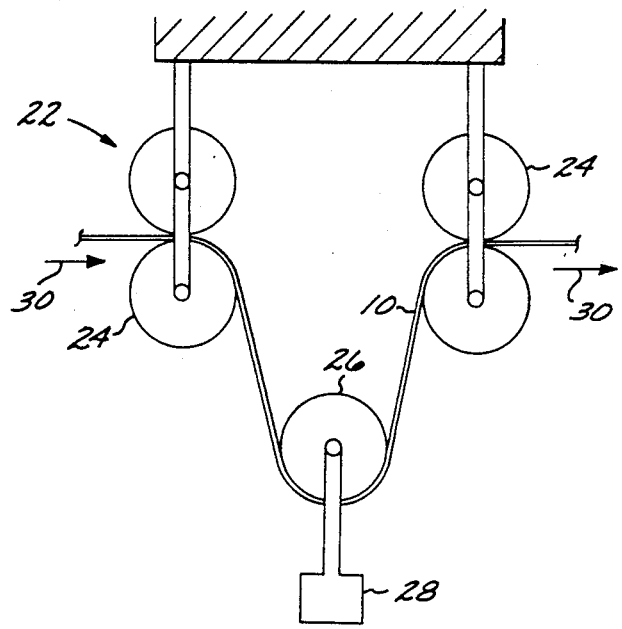

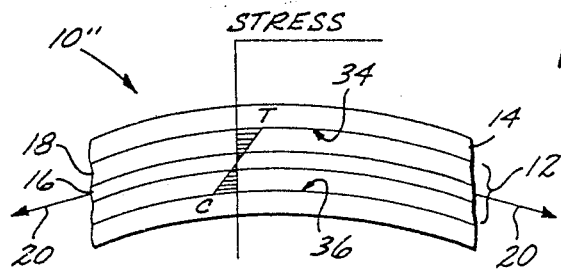
FIG. 4
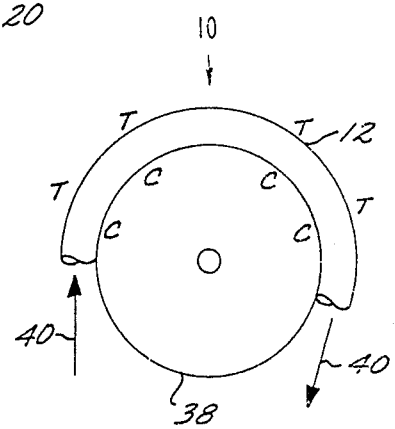
FIG. 5
FIG. 6
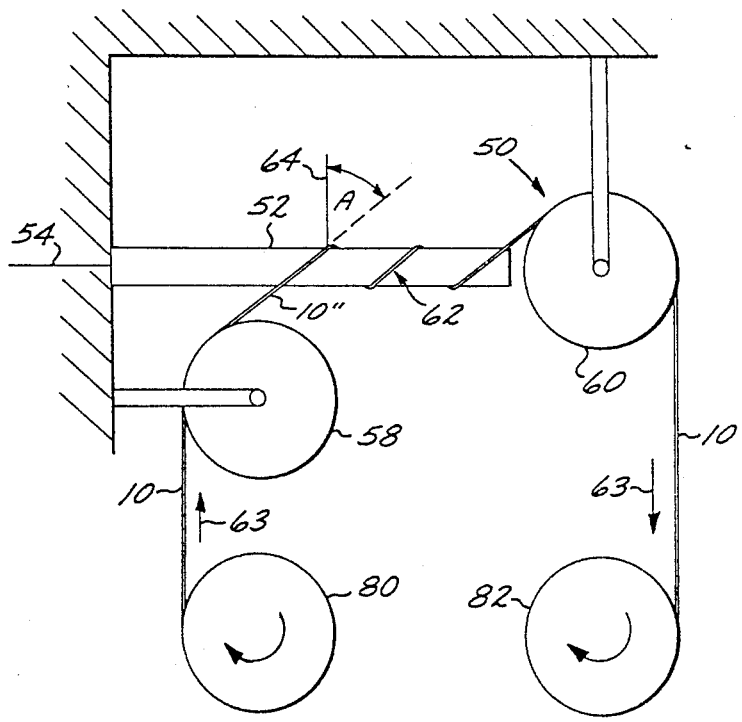

HELICAL BEND PROOF TESTING OF OPTICAL FIBERS

BACKGROUND OF THE INVENTION

This invention relates to optical fibers, and, more particularly, to the proof testing of optical fibers to ensure minimum strength levels.

Optical fibers consist of strands of optically pure glass fiber processed so that light beams transmitted therethrough are subject to total internal reflection. A significant fraction of the incident intensity of light directed into the fiber is received at the other end of the fiber, even though the fiber may be hundreds or thousands of meters long. Optical fibers have shown great promise in communications applications, because a high density of information may be carried along the fiber and because the quality of the signal is less subject to external interferences of various types, as compared to electrical signals carried on metallic wires. Moreover, the optical fibers are light in weight and made in large part from a highly plentiful substance, silicon dioxide.

Optical fibers are typically fabricated by preparing a preform of glasses of at least two different optical indices of refraction, one inside the other, or a single glass composition with a coating that ensures total internal reflection, and processing the preform to a glass fiber by drawing, extruding, or other method. The glass fiber is coated with a polymer layer termed a buffer coating to protect the glass from scratching or other damage. The optical fiber therefore includes two components, the glass fiber and the overlying buffer coating. As an example of the dimensions, in a typical configuration the diameter of the glass fiber is about 0.005 inches, and the total diameter of the optical fiber, including the glass fiber and the polymer buffer coating, is about 0.006 –0.010 inches.

In some applications, the optical fiber must have sufficient strength to bear some loading in use, in addition to transmitting light. In one example, optical fibers are wound under tension onto a bobbin and packaged in a canister, from which they are dispensed or paid out during use. The optical fiber must not fail during the winding and dispensing operations.

Glass fibers of the fine sizes mentioned above may be made with sufficient strength to carry the required loadings during winding and dispensing operations, and a great deal of manufacturing technology has been developed to fabricate glass fibers having such strengths. (The buffer coating itself has little strength, and is present to prevent introduction of surface defects into the glass fibers.) However, the strength of glass fibers is notoriously sensitive to even the slightest imperfections that may be present in the glass fibers. One slight imperfection in the glass fiber portion of over a thousand meters length of optical fiber may render the entire length of optical fiber useless. The buffer coating over the glass fiber is intended to prevent the introductions of imperfections into the glass fiber, but it is possible that such imperfections will be introduced during manufacture, transport to a canister winding facility, or storage before payout.

Proof testing is used to minimize the possibility of failures of the optical fiber during use, by inducing failure during testing, thereby permitting the discovery and repair of weak and flawed portions of the optical fiber. In conventional proof testing as presently performed, the optical fiber is loaded in tension to a preselected proof test load. If the optical fiber fails at any point along the loaded length, the break can be repaired by known splicing techniques that remove the region of the fiber containing the defect and reform the optical fiber without a defect present. If it is properly performed, proof testing works well for the testing of a material such as glass.

A conventional proof tester for optical fibers includes a pair of spaced apart rollers over which the optical fiber is fed, and a tensioning mechanism that applies a selected tensile force into the glass fiber portion of the optical fiber in the region between the rollers. The tensile force is selected to be greater than that which the optical fiber would experience during winding and dispensing operations, or such other use of the optical fiber as may be intended. The entire length of optical fiber, sometimes well over a thousand meters, is gradually passed over the rollers and through the tensioning region. If there is an imperfection in the glass fiber sufficiently large to cause failure under this proof test loading, the failure will occur during the testing and not during subsequent use. The weak region may then be repaired and retested to be certain that the entire optical fiber has the required mechanical properties.

Tensile proof testing is widely used for screening optical fibers to assure a minimum tensile strength. However, as the required strength level of the optical fibers has been gradually increased with increasing demands of use, it has been observed that the above-described tensile proof test procedure can itself cause damage to the buffer coating during testing as the optical fiber passes over the rollers, and that the damage to the buffer coating may later result in the introduction of post-testing imperfections in the glass fiber. Also, because the rollers tend to have diameters large enough to make the bending stress small compared to the tensile stress, the distance over which any particular length of the fiber is exposed to the proof stress is typically on the order of several feet. This long length results in the imposition of the stress on any particular length of fiber for at least a second. For many applications, shorter durations of stress are more advantageous, because significant new defects can be introduced if the period of stressing is too long.

There is therefore a need for a better approach to proof testing optical fibers, which achieves the required loading of the glass fibers and does not induce imperfections by virtue of the testing procedure. The present invention fulfills this need, and further provides related advantages.

SUMMARY OF THE INVENTION

The present invention provides a proof test method and apparatus for proof testing optical fibers in a manner that achieves complete testing of the fibers and does not damage either the glass fibers or the buffer coating during the testing procedure. The testing apparatus is highly versatile, and may be used to proof test for all defects or only selected defects, as might be required. The proof test apparatus of the invention is compact and less costly than the prior testing apparatus. The proof test approach of the invention is particularly appropriate where the principal mode of deformation during use in bending.

In accordance with the invention, a method for proof testing an optical fiber comprises the step of bending the optical fiber relative to its fiber axis to a preselected minimum radius of curvature, in all directions and at all points along the length of the optical fiber.

The present proof testing approach utilizes fiber bending to induce tensile stresses in the glass fiber portion of the optical fiber, to ascertain the presence of defects. The important advantage of proof testing by bending over proof testing by direct tensile loading is that the loading transmitted through the buffer coating is greatly reduced, so that there is far less likelihood of damage to the buffer coating using the bending proof test.

Proof testing by simple bending does not symmetrically load the optical fiber, and only limited portions of the circumference of the glass fiber are tested at any moment of the test. The bending proof test of the invention is therefore carefully designed to test all locations around the circumference of the glass fiber during the course of the test. In accordance with this aspect of the invention, a method for proof testing an optical fiber comprises the steps of furnishing an optical fiber; and winding the fiber into the shape of a series of separated helical turns, the number of turns being at least 360/4A, where A is the helical pitch angle in degrees.

In accordance with a preferred approach that has been found effective, a method for proof testing an optical fiber comprises the steps of furnishings an optical fiber; furnishing a cylindrical mandrel; and guiding the optical fiber over the mandrel in a helical pattern.

Passing the optical fiber over the mandrel in a helical pattern causes different regions of the glass fiber to be progressively loaded in bending. The amount of bending is determined by the radius of the mandrel and the helical pitch angle, and is selected from solid mechanics considerations to provide the required tensile loading of the glass fiber. However, in order to achieve proof test bending loading along the length of the glass fiber, the length of the helical spiral must be sufficiently long. Thus, more specifically, a method for proof testing an optical fiber comprises the steps of furnishing a cylindrical mandrel; and guiding an optical fiber over the mandrel in a helical pattern from a first guide to a second guide, the guides being displaced sufficiently far apart along the cylindrical axis of the mandrel so that the optical fiber contacts the mandrel along the entire circumference of the optical fiber in passing from the first guide to the second guide.

There is some freedom to select the helical pitch angle of the optical fiber wound into a helix, as around the mandrel or in a free and unsupported series of turns, but to achieve the bending loading of all areas around the circumference of the glass fiber, the number of turns N of the optical fiber around the mandrel is at least 360/4A, where A is the helical pitch angle in degrees. If one attempts to set N to unity, A becomes an unworkable 90 degrees. If one sets N equal to 2, A is 45 degrees. Thus, the preferred approach is to wind the optical fiber two full turns around the mandrel with a helical pitch angle of 45 degrees. Of course, N need not be an integer, but in that case the apparatus arrangement may be awkward.

The present invention also extends to apparatus that performs the described proof testing methodology in an automated fashion. In accordance with this aspect of the invention, apparatus for proof testing optical fibers comprises a cylindrical mandrel; a first guide disposed for directing an optical fiber tangential to the mandrel, the first guide being positioned at a first location along the cylindrical axis of the mandrel; and a second guide disposed for directing the optical fiber away from the mandrel, the second guide being positioned at a second location along the cylindrical axis of the mandrel. The guides are preferably rollers. As discussed previously, the preferred apparatus has the guides spaced such that two full turns of the optical fiber around the mandrel are achieved with a helical pitch angle of 45 degrees.

More generally, apparatus for proof testing an optical fiber comprises means for forming a length of the fiber into a pattern having a series of helical turns with at least 360/4A turns, wherein A is the helical pitch angle in degrees; and means for continuously feeding a length of fiber through the helical pattern. Such apparatus includes the preferred stationary mandrel tester, and apparatus that uses freestanding helical turns of fiber.

The present approach achieves complete proof testing of the glass fiber, around its entire circumference if desired, without placing a large load on the buffer coating. Although the optical fiber is maintained under a slight tension during the bending proof testing, the tensile loading is large enough only to prevent slack in the optical fiber and does not provide the greater part of the proof test loading. The proof test load is introduced into the fiber by bending it around the mandrel or otherwise into a helical shape. Overloading and damage of the buffer coating is thereby minimized. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a perspective drawing of an optical fiber:

FIG. 2 is a schematic drawing of a conventional tension proof testing apparatus;

FIG. 3 is a schematic depiction of the loading state of an optical fiber in the apparatus of FIG. 2;

FIG. 4 is a schematic depiction of the loading state of an optical fiber in bending;

FIG. 5 is a schematic depiction of the loading state of an optical fiber bent around a mandrel;

FIG. 6 is a schematic drawing of a bending proof test apparatus in accordance with the invention;

DETAILED DESCRIPTION OF THE INVENTION

Figure 7:
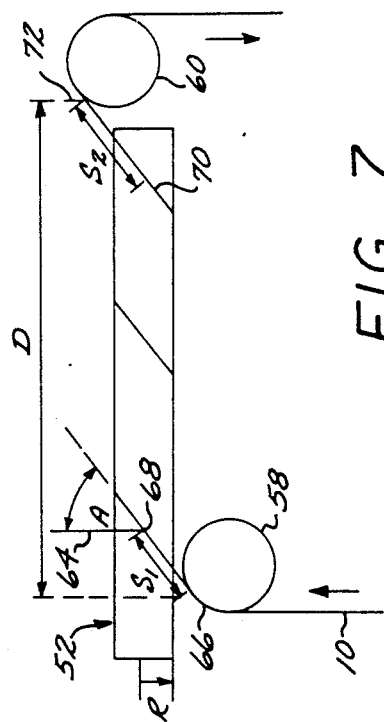
FIG. 7 is a detail of the mandrel of FIG. 6, with the parameters of analysis indicated.

A typical optical fiber 10 is illustrated in FIG. 1. The cylindrical optical fiber 10 includes a glass fiber 12 surrounded by a polymer buffer coating 14. The glass fiber 12 is formed of a core 16 of glass and a cladding 18 of a glass of lower index of refraction surrounding the core 16. The optical fiber 10 is very long as compared to its diameter, and may be defined by a fiber axis 20. By way of example and not of limitation, in one approach the core 16 is formed of a first type of silica-based glass, the cladding 18 is formed of a second type of silica-based glass having a slightly lower index of refraction, the cylindrical diameter of the glass fiber 12 is about 0.005 inches, the buffer coating 14 is a polymer such as epoxy acetate, and the cylindrical diameter of the buffer coating 14 is from about 0.008 to about 0.010 inches.

To proof test the optical fiber 10 by the conventional approach, a tension proof tester 22 of the general type illustrated in FIG. 2 is used. The tension proof tester 22 includes a pair of capstans 24 and a floating roller 26, the capstans supported from a fixed support and the roller weigthed by a mass 28. (Other approaches such as the use of tensioning rollers are also used, but in each case the objective is to apply a tension to the optical fiber 10.) The optical fiber 10 is looped over the capstans 24 and roller 26 so that all or a portion of the mass 28 plus the weight of the roller 26 is carried through the loaded portion of the optical fiber 10. The optical fiber 10 is passed over the capstans 24 and roller 26 in the directions indicated by the arrows 30, so that the entire length of the optical fiber 10 experiences the proof test loading as the loaded optical fiber 10.

The stress state in the loaded portion 10' of the optical fiber 10, produced by the tension proof test apparatus 22, is depicted in FIG. 3. The glass fiber 12 is loaded in tension (indicated by the letter T) throughout, and there is a very small induced tension loading in the buffer coating 14. Imperfections 32 at any location around the circumference or within the interior of the glass fiber 12 are detected by this approach, as the tension T is everywhere applied. The total force that must be transmitted into the optical fiber 10, through the buffer coating 14 in the region of the capstans 24 and roller 26, is approximately the magnitude of the stress T times the cross sectional area of the glass fiber 12. If T is large and/or the cross sectional area of the glass fiber 12 is large, the total force may be so large that the buffer coating 14 is damaged as it passes over one or the other of the capstans 24 or rollers 26.

In accordance with the present invention, the proof test loading may alternatively be applied by bending the optical fiber 10, as illustrated in FIG. 4. When a cylindrical optical fiber 10" is bent about its fiber axis 20, a tension stress T is created in the glass fiber 12 on the outside of the neutral axis, and a compression stress C is created in the glass fiber 12 on the inside of the neutral axis. The induced stresses in the buffer 14 are small, and for the present purposes can be ignored. The net stress parallel to the axis 20 is substantially zero, and there is consequently no stress that must be transmitted into the glass fiber 12 through the buffer coating 14 at remote points.

The bending approach therefore has the advantage that no stress must be transmitted through the buffer coating 14. In the form illustrated in FIG. 4, it has the disadvantage that only portions of the glass fiber 12 are actually tested. An imperfection 34 on the outside of the bend is loaded in tension and may fail during the proof testing. An imperfection 36 on the inside of the bend will be loaded in compression, and will not likely fail during the proof testing. Thus, a portion of the imperfections will escape detection during the bending operation. However, this limitation is consistent with the use of the present approach as a secondary testing procedure, in addition to tension testing. Tension testing is ordinarily performed on the uncoated fiber 12 before the coating 14 is applied, and interior defects are discovered at that time. After the fiber 12 has been coated with the coating 14, the present test is used to ascertain whether any surface defects have been formed subsequent to the tension testing.

FIG. 5 illustrates this aspect of the testing in another manner. A bending stress may be induced along the length of the glass fiber 12 by bending the optical fiber 10 over a roller 38. All portions on the outside of the bend of the glass fiber 12 will be in tension T, and all portions on the inside of the bend of the glass fiber 12 will be in compression C, according to the principles just discussed. The magnitudes of the tensile stresses T will all be the same, and the magnitudes of the compressive stresses C will all be the same. If the optical fiber is then passed over the roller 38 in the direction indicated by the arrows 40, the entire length of the glass fiber 12 that is on the outside of the bend is progressively loaded in tension, and any imperfections will be discovered, but the entire length of the glass fiber 12 that is on the inside of the bend is loaded in compression and any imperfections will not be discovered. Thus, simply bending the optical fiber around a roller 38 is not an effective bending proof test.

FIG. 6 illustrates a preferred bending proof testing apparatus 50 according to the present invention. The apparatus 50 includes a smooth, polished cylindrical mandrel 52 having a cylindrical axis 54, supported from a rigid support in a manner such that it does not turn. Two guides, here depicted as the preferred guide rollers, are provided. A first guide roller 58 is located adjacent the mandrel 52 and positioned so that an optical fiber 10 that passes over the roller 58 is guided into tangential contact with the mandrel 52. A second guide roller 60 is located adjacent the mandrel 52 and positioned so that an optical fiber 10 wound around the mandrel 52 in a tangential contact relationship may be passed over the second guide roller 60 and guided away from the tangential contact with the mandrel 52. The rollers 58 and 60 are displaced from each other along the cylindrical axis 54 of the mandrel 52. The rollers 58 and 60 are supported from rigid supports, and are not loaded by weights or tensioning devices of any type. The diameter of each of the rollers 58 and 60 should be much larger than the diameter of the mandrel 52, so that the greatest bending stresses are created when the optical fiber 10 is in contact with the mandrel 52 and not when it is in contact with either of the rollers 58 or 60.

In use, the optical fiber 10 is guided over the roller 58 into a tangential contact with the mandrel 52 and further into a helical pattern 62 around the mandrel 52. That is, the optical fiber 10 is bent and wound over the mandrel 52, but succeeding turns are displaced from each other along the axis 54. The helical pitch angle A of the helical pattern 62 is the angle between the optical fiber 10 and a line 64 perpendicular to the cylindrical axis 54 of the mandrel 52. After being in contact with the surface of the mandrel 52, the optical fiber 18 is guided away from the mandrel 52 by passing over the second guide roller 60. In operation, the optical fiber 10 is fed from a supply spool 80, moved over the first guide roller 58, drawn over the mandrel 52, drawn over the second guide roller 60, and then taken up on a take up spool 82. The optical fiber 10 is thus moved in the direction of the arrow 63 during operation, so that the entire length of the optical fiber 10 passes over the mandrel 52 in the helical pattern 62. The take up spool 82 is driven to turn about its axis (clockwise in the illustrated embodiment of FIG. 6) to apply sufficient force to move the optical fiber 10 through the proof tester during this test. It is normally not necessary to drive the supply spool 80, mandrel 52, or guide rollers 58 and 60, but any or all of these elements can also be driven during operation. Optionally, tensioning rollers or the like can be supplied to provide a small amount of tension in the optical fiber 10. However, the amount of tension applied by the bending proof test apparatus 50 is very small, and only need be sufficient to retain the wound geometry about the mandrel 52 during testing, and in this respect is distinguished from an apparatus such as the tension proof tester 22 of FIG. 2.

If there are no flaws and imperfections sufficiently large to cause the glass fiber 12, and thence the optical fiber 10, to fail at any point along its length during this progressive bending proof test operation, the operation proceeds with no interruption. If such a flaw is present, the glass fiber, and thence the optical fiberf, will break when the optical fiber is being passed over the mandrel 52. In that event, a length of the optical fiber adjacent the flawed region is removed and the ends spliced using any of the techniques known in the art, which are not within the scope of the present invention. The spliced length of optical fiber is then rewowned several meters onto the supply spool 80 and again run through the bending proof test apparatus 50 to evaluate whether the newly formed splice meets the proof test requirements.

As the optical fiber 10 is wound over the cylindrical mandrel 52, the outside portion of the glass fiber 12 is bent into the tension loading in the manner generally illustrated in FIGS. 4 and 5. The optical fiber 10 is bent into a uniform radius $R_{bend}$, which is related to the radius of the mandrel $R_{mandrel}$ by the relationship $$R_{bend} = R_{mandrel} \cdot \cos^2 A,$$

where "cos A" is the cosine of the angle A.

The required value of $R_{bend}$ is determined from the performance requirements of the optical fiber 10, and used in conjunction with the above relationship to determine the required radius of the mandrel. In a preferred approach, $R_{bend}$ is determined as $$R_{bend} = (25/P)(R/125),$$

where $R_{bend}$ is the bend radius in inches, P is the required tensile proof stress at the surface of the fiber in thousands of pounds per square inch, and R is the radius of the fiber in micrometers. From the above equation, $R_{bend}$ is calculated, and from the preceding equation, $R_{mandrel}$ is calculated. Typical values of the proof stress P are from 50,000 to 400,000 pounds per square inch, so that typical values of $R_{bend}$ are from 0.5 to 0.06 inches.

The helical pattern approach of the present invention permits the entire length and circumference of the glass fiber portion of the optical fiber to be stressed in tension as it passes over the mandrel 52. (This is in contrast to the situation discussed in relation to FIG. 5, wherein only a portion of the glass fiber 12 is placed into tension as it is bent over a roller in the absence of a helical advance.)

The helical winding pattern effectively places a slight apparent twist into the optical fiber 10, thereby progressively bringing succeeding portions of the circumference of the optical fiber 10 into contact with the surface of the mandrel 52. At each location, it is the outside of the bent portion of the glass fiber 12 that is in tension, and the gradual twist in the fiber causes each location along the circumference as well as the length of the glass fiber 12 to be placed into tension. The total angle in degrees of the twist in the glass fiber 12 is related to the number of turns of the fiber 12 in contact with the mandrel 52 and the helical pitch angle A by Total Twist = 4·N·A·

To achieve bending coverage of the entire glass fiber 12, the Total Twist must be at least 360 degrees.

Even though the mandrel 52 is polished, it is desired that the number of turns N be as small as possible, to minimize friction between the glass fiber and the surface of the mandrel. A full coverage of 360 degrees Total Twist is not possible with N of less than or equal to unity. At the next integral value, N=2, the above relationship establishes a helical angle A of 45 degrees, and this is the preferred helical angle. Larger values of N are operable but less preferred because of the larger number of turns around the mandrel required. Non-integral value of N greater than unity may be used where the placement of the guide rollers 58 and 60 permits such an approach, but are not preferred because of the ease of using the design illustrated in FIG. 6.

The remaining design parameter of the bending proof test apparatus 50 is the placement of the guide rollers along the cylindrical axis 54. FIG. 7 illustrates the details of the relationship of the optical fiber 10 to the mandrel 52 and the guide rollers 58 and 60. With the geometry illustrated in FIGS. 6 and 7, the optical fiber 10 leaves the first guide roller 58 tangential thereto at a first tangent point 66, and then contacts the mandrel at a second tangent point 68. At the other end of the helical pattern, the optical fiber 10 exits the mandrel 52 at a third tangent point 70, and first contacts the secnd guide roller 60 at a fourth tangent point 72.

The optical fiber 10 is under a slight tension and is generally linear from the first tangent point 66 to the second tangent point 68, and is similarly under a slight tension and generally linear form the third tangent point 70 to the fourth tangent point 72. The linear length of optical fiber 10 between the first tangent point 66 and the second tangent point 68 is $S_1$, and the linear length of optical fiber 10 between the third tangent point 70 and the fourth tangent point 72 is $S_2$. From the second tangent point 68 to the third tangent point 70, the optical fiber 10 is wrapped around the mandrel 52 in a helical pattern 62, with a helical pitch angle A and with N wraps or turns.

The distance D measured parallel to the axis 54 is the distance between the first tangent point 66 on the first guide roller 58 and the fourth tangent point 72 on the second guide roller 60. The distance D then describes the geometry of the bending proof test apparatus 50 of the illustrated embodiment. The distance D is determined as $$D = \sin A[(2\pi NR/\cos^2 A) + S_1 S_2].$$

where "sin A" is the sine of the helical pitch angle A. Thus, the design of the bending proof test apparatus is established unambiguously for the preferred embodiment illustrated in FIG. 6, where N is an integral value. In other circumstances, similar design relationships can be defined using the principles set forth herein.

Figure 8:
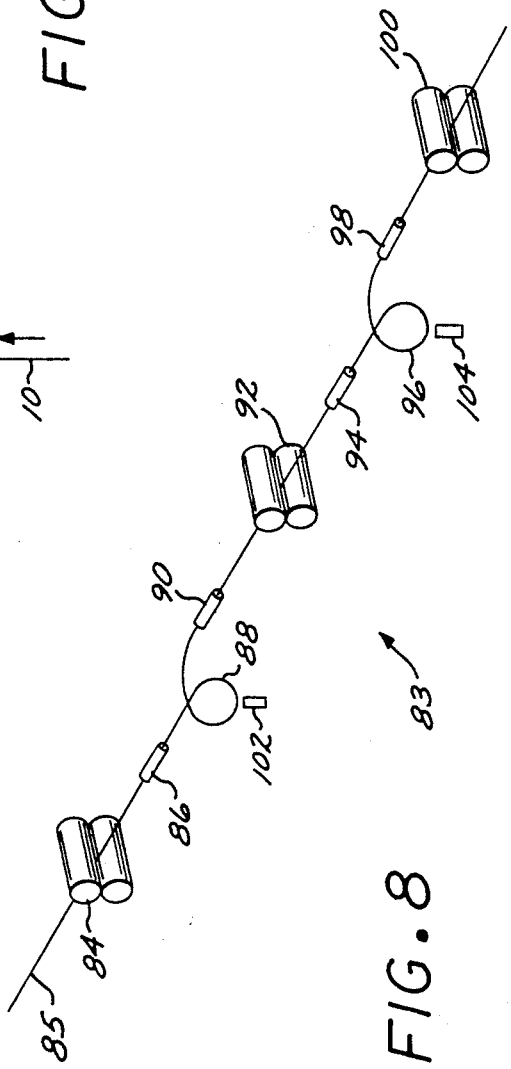
FIG. 8 is another form of testing apparatus wherein the fiber is bent into a series of unsupported helical turns.

Another approach to the helical bend proof tester is shown in FIG. 8. In this embodiment, the fiber is bent into a helix, but not over a mandrel. Since it is difficult to stabilize a series of helical turns, in the illustrated approach each individual turn of the helix is supported by guides, that then conduct the optical fiber to the next turn.

The tester 83 passes a fiber 85 between two drive rollers 84 and to a guide 86. The fiber is bent into a loop 88 and thence to another guide 90. The guides 86 and 90 are parallel, but displaced laterally to define a helical pitch angle for the loop 88. The fiber then passes between another pair of drive rollers 92 and to a guide 94. The fiber is formed into a loop 96 and directed through a guide 98. The guides 94 and 98 are parallel, but displaced laterally to define a helical pitch angle for the loop 96. The fiber then passes to a final pair of drive rollers 100. The sizes of the loops 88 and 96 are monitored by optical sensors 102 and 104, respectively, and fed back to the drive roller sets 84, 92, and 100 so that their speed of rotation can be controlled to keep the loops of constant size. The radius and helical pitch angle of each loop are determined by the same approach as previously described, except that there is no physical mandrel present. The embodiment of FIG. 8 has the advantage that there is no friction acting on the helical loops, but the disadvantage that the apparatus is more complex and costly than the mandrel apparatus.

The bending proof test apparatus can be made in a variety of configurations, but in all cases perform a bending proof test that permits a determination of whether the strength of the optical fiber is greater than a selected value, but without loading the fiber in tension to that value. The apparatus is compact and inexpensive, a consideration where large numbers and long lengths of optical fibers are to be evaluated. Although a particular embodiment of the invention has been described in detail for purpose of illustration, various modifications may be made without departing from the spirit and scope of the invention. Accordingly, the invention is not to be limited except as by the appended claims.

What is claimed is:

1. Apparatus for proof testing optical fibers, comprising:
   a cylindrical mandrel;
   a first guide disposed for directing an optical fiber tangential to the mandrel, the first guide being positioned at a first location along the cylindrical axis of the mandrel; and
   a second guide disposed for directing the optical fiber away from the mandrel, the second guide being positioned at a second location along the cylindrical axis of the mandrel.

2. The apparatus of claim 1, wherein the first guide is a roller.

3. The apparatus of claim 1, wherein the second guide is a roller.

4. The apparatus of claim 1, further including an optical fiber guided over the mandrel in a helical pattern.

5. The apparatus of claim 4, wherein the pitch angle of the helix is 45 degrees.

6. The apparatus of claim 4, wherein the first and second guides are spaced sufficiently far apart that the helix is wound around the mandrel with 360/4A turns, where A is the helical pitch angle in degrees.

7. Apparatus for proof testing an optical fiber, comprising:
   means for forming a length of the fiber into a pattern having a series of helical turns with at least 360/4A turns, wherein A is the helical pitch angle in degrees;
   means for continuously feeding a length of fiber through the helical pattern and
   the means for forming including a cylindrical mandrel over which the length of fiber is wound.

8. Apparatus for proof testing an optical fiber, comprising:
   means for bending the optical fiber relative to its fiber axis to a preselected minimum radius of curvature, in all directions and at all points along the length of the optical fiber; and
   the bending means including guides means for forming a free helix not contacting a support.

9. The apparatus of claim 8, wherein the means for forming includes guides that form a serious of separated single turns of fiber, the series of turns together totalling 360/4A turns.

10. A method for proof testing an optical fiber, comprising the steps of:
    furnishing a cylindrical mandrel; and
    guiding an optical fiber over the mandrel in a helical pattern from a first guide to a second guide, the guides being displaced sufficiently far apart along the cylindrical axis of the mandrel so that the optical fiber contacts the mandrel along the entire circumference of the optical fiber in passing from the first guide to the second guide.

11. The method of claim 10, wherein the helical pitch angle of the helical pattern is about 45 degrees.

12. The method of claim 10, wherein the first and second guides are spaced sufficiently far apart that the helix is guided around the mandrel with 360/4A turns, where A is the helical pitch angle in degrees.

13. A method for proof testing an optical fiber, comprising the steps of:
    furnishing an optical fiber; and
    winding the fiber into the shape of a series of separated, individual helical turns, the number of turns being at least 360/4A, where A is the helical pitch angle in degrees and the individual turns do not contact any support.

14. A method for proof testing an optical fiber, comprising the steps of:
    bending the optical fiber relative to its fiber axis to form a helical pattern having a preselected minimum radius of curvature, in all directions and at all points along the length of the optical fiber.

15. The method of claim 14, wherein the helical pitch angle of the helical pattern is about 45 degrees.

16. The method of claim 14, wherein helical pattern is formed as at least 360/4A turns around a mandrel, where A is the helical pitch angle in degrees.

17. The method of claim 14, wherein the helix is formed of a series of separated individual turns of the fiber.

18. The method of claim 14, wherein the individual turns of the helical pattern do not contact any support.

* * * * *